(No Model.)
F. A. JOHNSON.
RAT TRAP.
No. 452,575. Patented May 19, 1891.
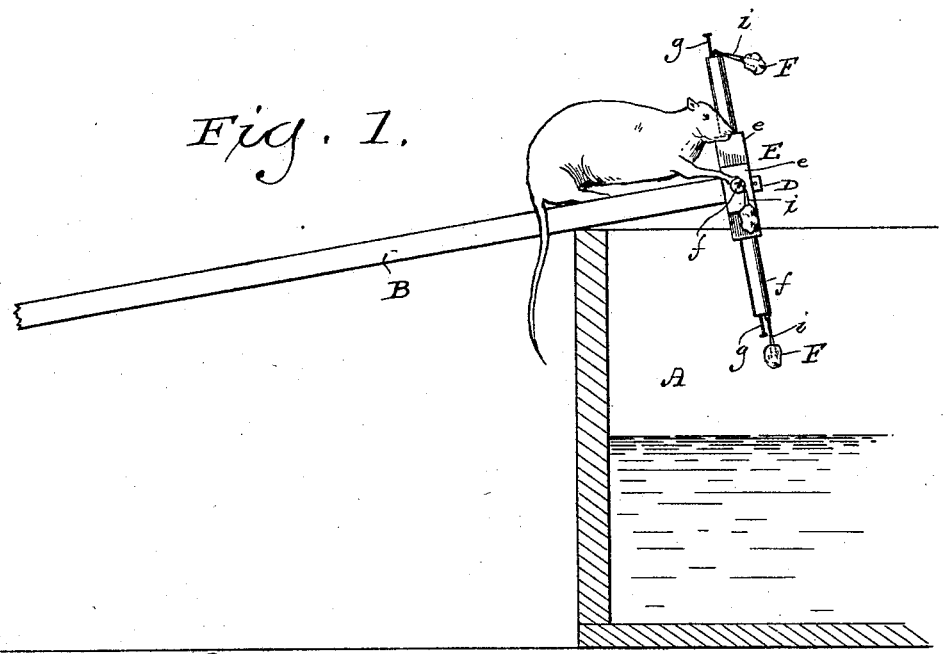
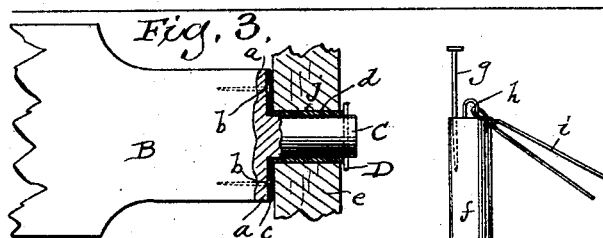
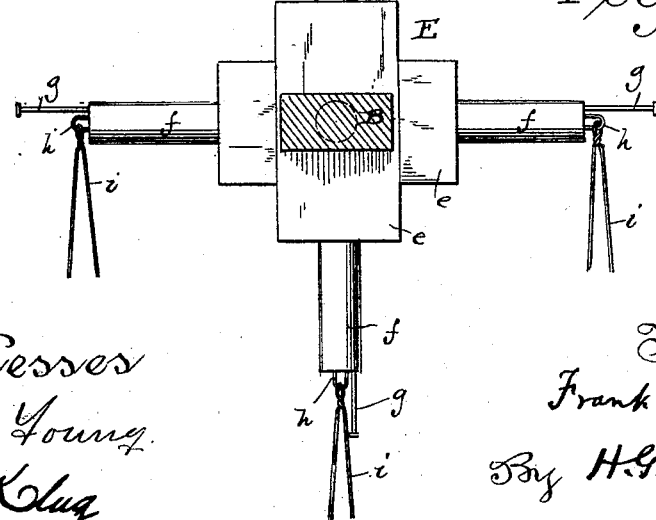
Witnesses
Geo. W. Young.
Wm K Lug
Inventor
Frank A. Johnson
By H. G. Underwood
Attorney

UNITED STATES PATENT OFFICE.

FRANK A. JOHNSON, OF RACINE, WISCONSIN.

RAT-TRAP.

SPECIFICATION forming part of Letters Patent No. 452,575, dated May 19, 1891.

Application filed December 22, 1890. Serial No. 375,499. (No model.)

*To all whom it may concern:*

Be it known that I, FRANK A. JOHNSON, a citizen of the United States, and a resident of Racine, in the county of Racine, and in the State of Wisconsin, have invented certain new and useful Improvements in Rat-Traps; and I do hereby declare that the following is a full, clear, and exact description thereof.

My invention relates to rat-traps; and it consists in certain peculiar and novel features of construction, to be hereinafter described, and pointed out in the appended claims.

In the drawings, Figure 1 represents a side view, partly in section; Fig. 2, an end view, partly in transverse section; and Fig. 3, a plan view, partly in longitudinal section.

Referring to the drawings, A represents a receptacle partially filled with water or any other liquid, and resting upon and extending a suitable distance beyond the edge of this receptacle, above the liquid therein, is a plank B, one end of which is designed to rest upon the floor or other surface. The other end of said plank B is cut away to form a stud C and shoulders $a\ a$, and over said stud C there is preferably slipped a perforated metallic anti-friction plate or rub-iron $c$, which may be secured against the shoulders $a\ a$, as by nails or screws $b\ b$, with heads countersunk into said plate $c$, as shown. A metallic sleeve or thimble $d$ is preferably slipped over the stud C to obviate wear and friction when the revoluble head E is applied thereto. This head E is preferably composed of two bars $e\ e$, which may be mortised into each other, if made of wood, (though of course said head may be made all in one piece and of either wood or metal, or of any material preferred,) and extending from the ends of these bars are arms $f\ f$, which in turn are formed or provided at their ends with nails or pins $g\ g$, and rings, eyes, or staples $h\ h$, and loosely secured to the latter are bait hooks or pins $i\ i$. When the head E, which is provided with a central opening $j$, has been slipped to place on the stud C, it is secured by any suitable means, such as the transverse pin D shown.

The operation of my device will be readily understood from the foregoing description of its construction, taken in connection with the accompanying drawings. The rat is supposed to run up along the plank B until it comes to the head E, and, thinking it is rigidly secured, will put its paw out on the nail or pin $g$ to get the bait F on the hook $i$, thereby revolving the said head E and causing the rat to lose its balance and fall into the liquid beneath and drown.

Although I have shown and described the shoulders $a\ a$ of the plank B as being provided with a rub iron or plate $c$, and the opening $j$ in the head E as being provided with a thimble $d$, and ordinarily prefer this construction, I do not wish to be understood as limiting myself thereto, as my device will operate successfully if the same are dispensed with, they being simply employed to reduce the friction and to prevent the parts from wearing out.

If found desirable, the nails or pins $g$ may be dispensed with and the arms $f$ made proportionally longer, and have at about midway of their length the staples $h$ projecting laterally therefrom, to which the bait-hooks $i$ would be attached, as before.

Having thus described my invention, what I claim as new, and desire to secure by Letters Patent, is—

1. The combination of a plank designed to form an inclined plane between a floor or other support and the upper end of a suitable receptacle, a transverse revoluble head on the receptacle end of the plank, and bait-hooks suspended from the head at suitable intervals, substantially as set forth.

2. The combination of a plank having a stud at one end thereof and being designed to form an inclined plane between a floor or other support and the upper end of a suitable receptacle, a head revoluble on the stud transverse to the plank, and bait-hooks suspended from the head at suitable intervals, substantially as set forth.

3. The combination of a plank having a stud at one end thereof and being designed to form an inclined plane between a floor or other support and the upper end of a suitable receptacle, bars secured together to form a head revoluble on the stud transverse to the plank, arms extending from the said bars, and bait-hooks suspended therefrom, substantially as set forth.

4. The combination of a plank having a stud on one end thereof and being designed to form an inclined plane between a floor or other support and the upper end of a suitable receptacle, a revoluble head on said stud, arms projecting from said head, nails or pins and staples projecting from the ends of said arms, and bait-hooks suspended from the said staples, substantially as set forth.

In testimony that I claim the foregoing I have hereunto set my hand at Racine, in the county of Racine and State of Wisconsin, in the presence of two witnesses.

FRANK A. JOHNSON.

Witnesses:
JAMES McLAREN,
JNO. B. WINSLOW.